United States Patent
Patil et al.

(10) Patent No.: US 11,149,182 B2
(45) Date of Patent: Oct. 19, 2021

(54) SPACER FLUIDS WITH STABILITY AT HIGH TEMPERATURES

(71) Applicant: HALLIBURTON ENERGY SERVICES, INC., Houston, TX (US)

(72) Inventors: Sandip Prabhakar Patil, Pune (IN); Ganesh Shriniwas Pangu, Pune (IN); Maithili Ashok Dumbre, Pune (IN); Faisal Saeed, Bangkok (TH)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/483,506

(22) PCT Filed: Oct. 12, 2018

(86) PCT No.: PCT/US2018/055536
§ 371 (c)(1),
(2) Date: Aug. 5, 2019

(87) PCT Pub. No.: WO2020/076334
PCT Pub. Date: Apr. 16, 2020

(65) Prior Publication Data
US 2021/0253929 A1   Aug. 19, 2021

(51) Int. Cl.
*C09K 8/40* (2006.01)
*E21B 21/00* (2006.01)
*E21B 33/14* (2006.01)

(52) U.S. Cl.
CPC .............. *C09K 8/40* (2013.01); *E21B 21/00* (2013.01); *E21B 33/14* (2013.01)

(58) Field of Classification Search
None
See application file for complete search history.

(56) References Cited

U.S. PATENT DOCUMENTS

| | | | |
|---|---|---|---|
| 5,030,366 A * | 7/1991 | Wilson | C09K 8/46 507/228 |
| 6,478,868 B1 * | 11/2002 | Reddy | C04B 14/062 106/696 |
| 9,708,523 B2 | 7/2017 | Allison et al. | |
| 2005/0230116 A1 | 10/2005 | Eoff et al. | |

(Continued)

FOREIGN PATENT DOCUMENTS

| WO | WO 2016/182553 A1 | 11/2016 |
| WO | WO 2017/127304 A1 | 7/2017 |

OTHER PUBLICATIONS

International Search Report and Written Opinion of the International Search Authority dated Jul. 12, 2019, PCT/US2018/055536, 12 pages, ISA/KR.

*Primary Examiner* — Andrew Sue-Ako
(74) *Attorney, Agent, or Firm* — Haynes and Boone, LLP

(57) ABSTRACT

Methods of treating a subterranean formation including providing a spacer fluid including acrylamide/2-acrylamido-2-methylpropane sulfonic acid grafted copolymer (acrylamide copolymer), polyethylene glycol alkyl ether sulfate (PEGAES), and ethoxylated nonylphenol (ENP), and introducing the spacer fluid into a wellbore of the subterranean formation to displace at least a portion of a first fluid from the wellbore. The spacer fluid maintains its yield point for at least half an hour when subjected to a temperature of greater than 300° F.

20 Claims, 2 Drawing Sheets

(56) References Cited

U.S. PATENT DOCUMENTS

2007/0261849 A1\* 11/2007 Valenziano ............ C09K 8/467
　　　　　　　　　　　　　　　　　　　　　　166/291
2009/0023817 A1　　1/2009 Ahrens et al.
2011/0120713 A1\* 5/2011 Todd ..................... E21B 43/267
　　　　　　　　　　　　　　　　　　　　　　166/280.1

\* cited by examiner

SPACER FLUIDS WITH STABILITY AT HIGH TEMPERATURES

BACKGROUND

The present disclosure generally relates to spacer fluids and methods of treating a subterranean formation using the spacer fluids. In particular, the present disclosure relates to spacer fluids having improved thermal stability at downhole temperatures greater than 300° F.

Spacer fluids are often used in subterranean operations to facilitate improved displacement efficiency when introducing new fluids into a wellbore. For example, a spacer fluid can be used to displace a fluid in a wellbore before introduction of another fluid. When used for drilling fluid displacement, spacer fluids can enhance solids removal as well as separate the drilling fluid from a physically incompatible fluid. For instance, in primary cementing operations, the spacer fluid may be placed into the wellbore to separate the cement composition from the drilling fluid. Spacer fluids may also be placed between different drilling fluids during drilling change outs or between a drilling fluid and a completion brine, for example.

To be effective, the spacer fluid can have certain characteristics. For example, the spacer fluid may be compatible with the drilling fluid and the cement composition. This compatibility may also be present at downhole temperatures and pressures. In some instances, it is also desirable for the spacer fluid to leave surfaces in the wellbore water wet, thus facilitating bonding with the cement composition. Rheology of the spacer fluid can also be important. A number of different rheological properties may be important in the design of a spacer fluid, including yield point, plastic viscosity, gel strength, and shear stress, among others. While rheology can be important in spacer fluid design, conventional spacer fluids may not have the desired rheology at downhole temperatures. For instance, conventional spacer fluids may experience undesired thermal thinning at elevated temperatures. A high degree of thermal thinning normally limits available downhole viscosity, particularly at elevated temperatures. As a result, conventional spacer fluids may not provide the desired displacement in some instances.

Thus, there is a continuing need for improved spacer fluids, and particularly spacer fluids with stable viscosity at elevated temperatures.

BRIEF DESCRIPTION OF THE DRAWINGS

The following figures are included to illustrate certain aspects of the present disclosure, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

Figure 1:
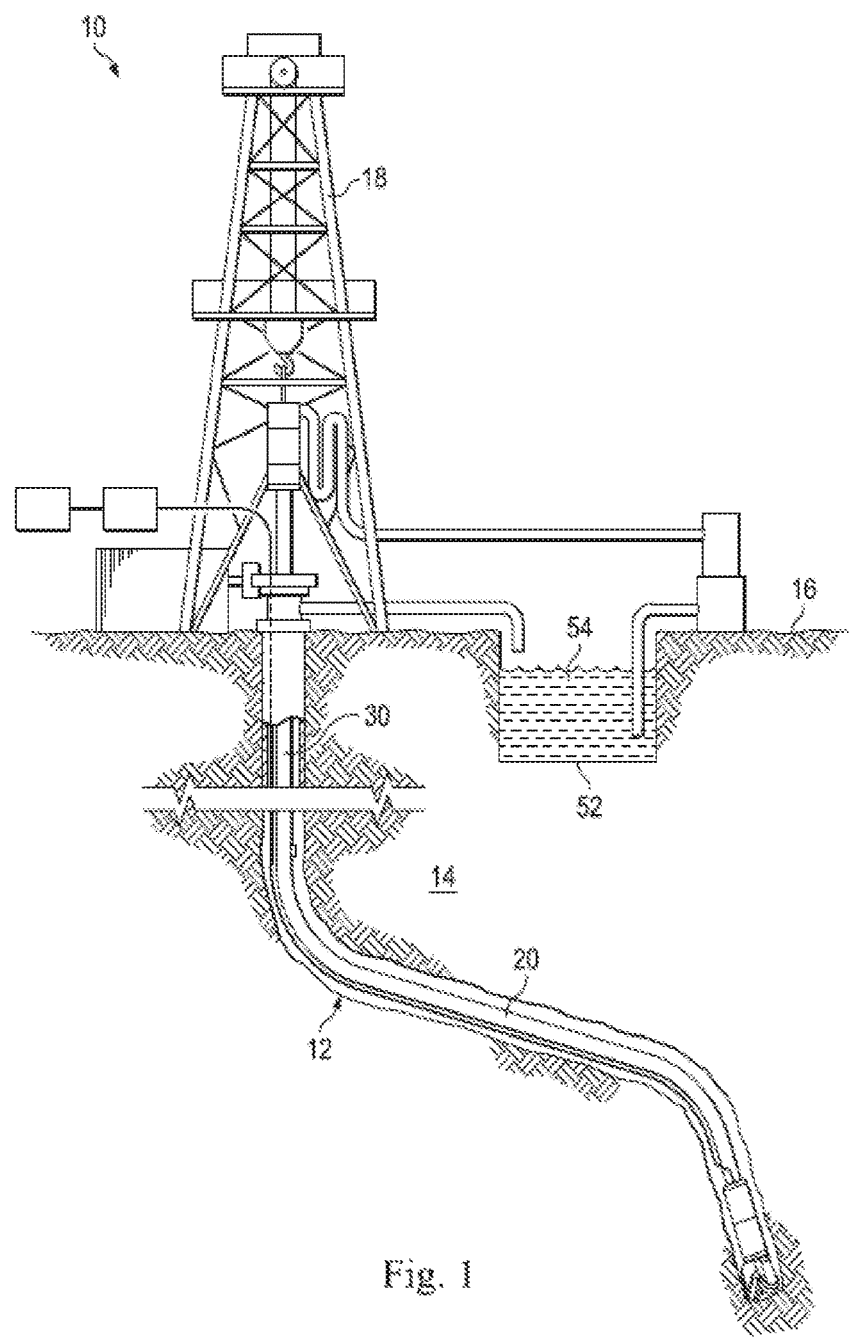
FIG. 1 illustrates a land-based drilling and production system.

According to several exemplary embodiments, addition of a combination of acrylamide/2-acrylamido-2-methylpropane sulfonic acid grafted copolymer ("acrylamide copolymer"), polyethylene glycol alkyl ether sulfate (PEGAES), and ethoxylated nonylphenol (ENP) in a spacer fluid enhances one or more rheological properties of a spacer fluid. Advantageously, the combination of the copolymer and two surfactants may be used in spacer fluids as a rheology modifier that allows formulation of a spacer fluid with desirable rheological properties. Another advantage is that inclusion of the combination in the spacer fluids results in a spacer fluid with reduced thermal thinning.

According to several exemplary embodiments, the spacer fluid is used to displace a first fluid from a wellbore and separate the first fluid from an incompatible second fluid in a well. For example, the first fluid may be a drilling fluid and the second fluid may be a cement composition. The drilling fluid may include, for example, any number of fluids, such as solid suspensions, mixtures, and emulsions. The cement composition may include, for example, cement and water.

According to several exemplary embodiments, the spacer fluid functions to separate the first fluid from the second fluid and to remove the first fluid from the walls of the well. In drilling and completion operations, the purpose of the spacer fluid is to suspend and remove partially dehydrated/gelled drilling fluid and drill cuttings from the wellbore and allow a second fluid, e.g., a completion brine, to be placed in the wellbore.

According to several exemplary embodiments, a method of treating a subterranean formation is provided. The method includes providing a spacer fluid that includes acrylamide copolymer, PEGAES, and ENP; and introducing the spacer fluid into a wellbore of the subterranean formation to displace at least a portion of a first fluid from the wellbore. According to several exemplary embodiments, the method further includes subjecting the spacer fluid to temperatures greater than 300° F. The spacer fluid maintains its yield point for at least half an hour when subjected to a temperature of greater than 300° F. The term "introducing" or its variations, as used herein, includes pumping, injecting, pouring, releasing, displacing, spotting, circulating, or otherwise placing a fluid or material within a well, wellbore, or subterranean formation using any suitable manner known in the art.

According to several exemplary embodiments, the acrylamide copolymer, the PEGAES, or the ENP is present in an amount of about 0.1% to about 25% by weight of the spacer fluid. According to several exemplary embodiments, the acrylamide copolymer, the PEGAES, and the ENP are each present in an amount of about 0.1% to about 25% by weight of the spacer fluid.

According to several exemplary embodiments, the spacer fluid further includes a weighting agent or a defoaming agent. According to several exemplary embodiments, the spacer fluid further includes polysaccharide gum, sepiolite clay, calcium carbonate, and walnut shells.

According to several exemplary embodiments, the first fluid includes a drilling fluid. According to several exemplary embodiments, the method further includes introducing a cement composition into the wellbore to displace at least a portion of the spacer fluid from the wellbore, wherein the spacer fluid separates the cement composition from the drilling fluid.

According to several exemplary embodiments, a pump is used to introduce the spacer fluid into the wellbore.

According to several exemplary embodiments, a spacer fluid is provided. The spacer fluid includes water, acrylamide copolymer, PEGAES, and ENP. The spacer fluid maintains its yield point for at least half an hour when subjected to a temperature of greater than 300° F.

According to several exemplary embodiments, the water is present in an amount of about 15% to about 98% by weight of the spacer fluid, the acrylamide copolymer is present in an amount of about 0.1% to about 25% by weight of the spacer fluid, the PEGAES is present in an amount of about 0.1% to about 25% by weight of the spacer fluid, and the ENP is present in an amount of about 0.1% to about 25% by weight of the spacer fluid.

According to several exemplary embodiments, the spacer fluid further includes a weighting agent or a defoaming agent. According to several exemplary embodiments, the spacer fluid further includes polysaccharide gum, sepiolite clay, calcium carbonate, and walnut shells.

According to several exemplary embodiments, the spacer fluid has a density of about 8 pounds per gallon (ppg) to about 20 ppg.

Turning now to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system 10 may include various types of tools or equipment 20 supported by rig 18 and disposed in wellbore 12 for performing these activities.

A working or service fluid source 52, such as a storage tank or vessel, may supply a working fluid 54 that is pumped to the upper end of tubing string 30 and flows through tubing string 30. Working fluid source 52 may supply any fluid utilized in wellbore operations, including without limitation, drilling fluid, spacer fluid, slurry, cement composition, acidizing fluid, liquid water, steam, hydraulic fracturing fluid, propane, or some other type of fluid.

According to several exemplary embodiments, the spacer fluids include water and the combination of acrylamide copolymer, PEGAES, and ENP. According to several exemplary embodiments, the combination of acrylamide copolymer, PEGAES, and ENP is included in the spacer fluids as a rheology modifier. The combination of acrylamide copolymer, PEGAES, and ENP provide a synergy that creates a positive impact on the rheology of the spacer fluid. Among other things, it has been discovered that using the combination of acrylamide copolymer, PEGAES, and ENP can provide spacer fluids having a rheology suitable for a particular application. Desirable rheology may be advantageous to provide a spacer fluid that is effective for drilling fluid displacement. In some instances, the combination of acrylamide copolymer, PEGAES, and ENP can be used to provide a spacer fluid with a low degree of thermal thinning. For example, the spacer fluid may have a yield point higher than conventional spacer fluids at elevated temperatures, such as those temperatures encountered downhole. As used herein, "yield point" refers to the resistance of a fluid to initial flow, or representing the stress required to start fluid movement.

According to several exemplary embodiments, the spacer fluid maintains its yield point at temperatures greater than 300° F. even when subjected to temperatures greater than 300° F. for a certain period of time. As used herein, "maintain" means changes less than 10%, for example, less than 8% or less than 6%. According to several exemplary embodiments, the certain period of time is at least about half an hour, for example an hour or an hour and a half or 2 hours.

According to several exemplary embodiments, the spacer fluid maintains its yield point for at least half an hour when subjected to a temperature of greater than 300° F. According to several exemplary embodiments, the spacer fluid maintains its yield point for at least half an hour when subjected to a temperature of 325° F. According to several exemplary embodiments, the spacer fluid maintains its yield point for about 2 hours when subjected to a temperature greater than 300° F. (e.g., 325° F.).

According to several exemplary embodiments, the water used in the spacer fluids include, for example, freshwater, saltwater (e.g., water containing one or more salts dissolved therein), brine (e.g., saturated saltwater produced from subterranean formations), seawater, or any combination thereof. Generally, the water may be from any source, provided that the water does not contain an excess of compounds that may undesirably affect other components in the spacer fluid.

According to several exemplary embodiments, the water is included in an amount sufficient to form a pumpable spacer fluid. In exemplary embodiments, the water is included in the spacer fluids in an amount in the range of about 15% to about 98% by weight of the spacer fluid. In other exemplary embodiments, the water is included in the spacer fluids in an amount of about 20% to about 95% by weight of the spacer fluid. One of ordinary skill in the art, with the benefit of this disclosure, will recognize the appropriate amount of water to include for a chosen application.

According to several exemplary embodiments, the combination of acrylamide copolymer, PEGAES, and ENP is included in the spacer fluids in an amount sufficient to provide, for example, the desired rheological properties. In exemplary embodiments, the acrylamide copolymer is present in the spacer fluids in an amount of about 0.1% to about 25% by weight of the spacer fluid (e.g., about 1%, about 5%, about 10%, about 15%, about 20%, or about 25%). In some exemplary embodiments, the acrylamide copolymer is present in the spacer fluids in an amount in the range of about 0.25% to about 10% by weight of the spacer fluid. In some exemplary embodiments, the acrylamide copolymer is present in an amount in the range of about 0.5% to about 5% by weight of the spacer fluid.

According to several exemplary embodiments, PEGAES is present in the spacer fluids in an amount of about 0.1% to about 25% by weight of the spacer fluid (e.g., about 1%, about 5%, about 10%, about 15%, about 20%, or about 25%). In some exemplary embodiments, PEGAES is present in the spacer fluids in an amount in the range of about 0.25% to about 10% by weight of the spacer fluid. In some exemplary embodiments, PEGAES is present in an amount in the range of about 0.5% to about 5% by weight of the spacer fluid.

According to several exemplary embodiments, ENP is present in the spacer fluids in an amount of about 0.1% to about 25% by weight of the spacer fluid (e.g., about 1%, about 5%, about 10%, about 15%, about 20%, or about 25%). In some exemplary embodiments, ENP is present in the spacer fluids in an amount in the range of about 0.25% to about 10% by weight of the spacer fluid. In some exemplary embodiments, ENP is present in an amount in the range of about 0.5% to about 5% by weight of the spacer fluid.

The spacer fluids generally should have a density suitable for a particular application. In exemplary embodiments, the spacer fluids have a density in the range of about 5 pounds per gallon ("ppg") to about 25 ppg. In other exemplary embodiments, the spacer fluids have a density in the range of about 8 ppg to about 20 ppg. In yet other exemplary embodiments, the spacer fluids have a density in the range of about 10 ppg to about 15 ppg.

A wide variety of additional additives may be included in the spacer fluids as deemed appropriate by one of ordinary skill in the art, with the benefit of this disclosure. Examples of such additives include, but are not limited to, weighting agents (e.g., barite), viscosifying agents (e.g., clays, hydratable polymers, guar gum), fluid loss control additives, lost circulation materials, filtration control additives, dispersants, defoamers, corrosion inhibitors, scale inhibitors, formation conditioning agents. Specific examples of these, and other, additives include organic polymers, surfactants, crystalline silica, amorphous silica, fumed silica, salts, fibers, hydratable clays, microspheres, rice husk ash, and combinations thereof. A person having ordinary skill in the art, with the benefit of this disclosure, will readily be able to determine the type and amount of additive useful for a particular application and desired result.

The spacer fluids may be prepared in accordance with any suitable technique. In some exemplary embodiments, the desired quantity of water may be introduced into a mixer (e.g., a cement blender) followed by the combination of acrylamide copolymer, PEGAES, and ENP. Solid additives and liquid additives may be added to the water as desired prior to, or after, mixing with the combination. As will be appreciated by those of ordinary skill in the art, with the benefit of this disclosure, other suitable techniques for preparing spacer fluids may be used in accordance with the present disclosure.

Figure 2:
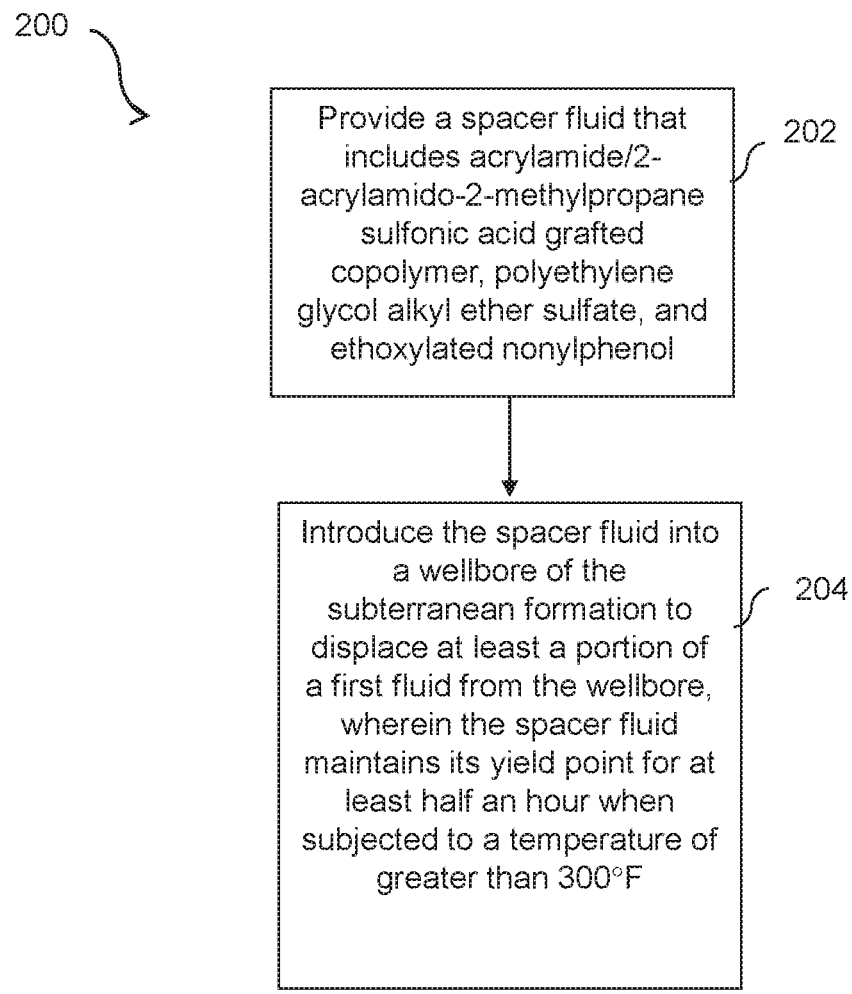
FIG. 2 depicts a method of treating a subterranean formation according to one or more embodiments of the present disclosure.

According to several exemplary embodiments, a method of treating a subterranean formation is provided. Turning now to FIG. 2, the method 200 includes providing a spacer fluid that includes acrylamide copolymer, PEGAES, and ENP in step 202, and introducing, for example, pumping, the spacer fluid into a wellbore of the subterranean formation to displace at least a portion of a first fluid from the wellbore at step 204. The spacer fluid maintains its yield point for at least half an hour when subjected to a temperature of greater than 300° F.

According to several exemplary embodiments, the first fluid is a drilling fluid. According to several exemplary embodiments, the method further includes introducing a second fluid into the wellbore after introducing the first fluid. According to several exemplary embodiments, the second fluid includes a cement composition. In several exemplary embodiments, the cement composition includes water and a hydraulic cementitious material. A variety of hydraulic cements may be utilized, including, but not limited to, those including calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain exemplary embodiments, the hydraulic cement includes a Portland cement.

According to several exemplary embodiments, the spacer fluid prevents the cement composition from contacting the drilling fluid. According to several exemplary embodiments, the spacer fluid removes the drilling fluid, dehydrated/gelled drilling fluid, and/or filter cake solids from the wellbore in advance of the cement composition. Removal of these compositions from the wellbore may enhance bonding of the cement composition to surfaces in the wellbore. In several exemplary embodiments, at least a portion of used and/or unused spacer fluid including the combination of acrylamide copolymer, PEGAES and ENP are included in the cement composition that is placed into the well and allowed to set.

According to several exemplary embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes and/or procedures may be merged into one or more steps, processes and/or procedures. In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

The following examples are illustrative of the compositions, fluids, and methods discussed above and are not intended to be limiting.

EXAMPLE 1

Spacer Fluids having a Density of 13.4 lb/gal

Spacer fluid formulations having different compositions but a constant density of 13.4 pounds per gallon (lb/gal) were mixed, and the components of each formulation are provided in Table 1 below.

TABLE 1

SPACER FLUID FORMULATIONS

| Materials | Unit of Measurement | Slurry 1 | Slurry 2 | Slurry 3 | Slurry 4 |
| --- | --- | --- | --- | --- | --- |
| Mixture of polysaccharide gum, sepiolite clay, calcium carbonate, and walnut shells | lb/bbl | 35 | 35 | 35 | 35 |
| Acrylamide Copolymer | gal/bbl | — | — | 0.4 | 0.4 |
| PEGAES | gal/bbl | — | 0.45 | — | 0.45 |
| ENP | gal/bbl | — | 0.5 | — | 0.5 |
| Barite | lb/bbl | 257.9 | 257.3 | | 256.5 |
| D-Air 3000L ™ Defoamer | gal/bbl | 0.1 | 0.1 | 0.1 | 0.1 |
| Water | gal/bbl | 32.2 | 31.3 | 31.7 | 30.7 |

Viscosities of the different formulations were measured at different temperatures and at a pressure of 5500 pounds per square inch (psi) on a Fann-77 viscometer. The rheology numbers and the plastic viscosity (PV) are reported in units of centipoise (cP). The yield points (YP) are reported in units of pound-force per square feet (lbf/100 ft$^2$), and were calculated by using the Bingham Plastic model. After mixing the spacer fluid formulations, each formulation was poured into a Fann-77 cell and a pressure of 5500 psi was applied. The rheology at 80° F. at different rpm levels was measured, the temperature was ramped up to 180° F., and rheology at different rpm levels was measured at 180° F. Then the temperature was increased to 325° F. and the rheology was measured at different rpm levels. The spacer fluid formulations were then held at 325° F. for 30 minutes at 200 rpm, the rheology was measured, and the stability of the spacer fluid formulations at 325° F. was checked. The results are provided in Table 2 below.

TABLE 2

RHEOLOGY DATA RESULTS

| RPM | Slurry 1 | | | | Slurry 2 | | | | Slurry 3 | | | | Slurry 4 | | | |
| --- | --- | --- | --- | --- | --- | --- | --- | --- | --- | --- | --- | --- | --- | --- | --- | --- |
| | 80° F. | 180° F. | 325° F. | 325° F.* | 80° F. | 180° F. | 325° F. | 325° F.* | 80° F. | 180° F. | 325° F. | 325° F.* | 80° F. | 180° F. | 325° F. | 325° F.* |
| 300 | 85 | 67 | 17 | 12 | 85 | 59 | 19 | 12 | 93 | 68 | 15 | 15 | 97 | 75 | 22 | 26 |
| 200 | 65 | 57 | 15 | 10 | 71 | 50 | 18 | 10 | 72 | 56 | 13 | 13 | 76 | 62 | 21 | 24 |
| 100 | 46 | 46 | 13 | 9 | 49 | 41 | 15 | 9 | 51 | 42 | 12 | 12 | 52 | 49 | 18 | 22 |
| 60 | 38 | 40 | 12 | 8 | 40 | 36 | 14 | 9 | 41 | 35 | 11 | 11 | 41 | 41 | 16 | 21 |
| 30 | 31 | 33 | 10 | 7 | 31 | 31 | 13 | 8 | 32 | 28 | 9 | 9 | 32 | 33 | 15 | 18 |
| 6 | 19 | 22 | 9 | 6 | 18 | 20 | 12 | 7 | 18 | 14 | 7 | 7 | 17 | 19 | 14 | 14 |
| 3 | 16 | 19 | 9 | 5 | 15 | 18 | 11 | 6 | 14 | 12 | 6 | 6 | 13 | 15 | 14 | 12 |
| PV | 66 | 45 | 8 | 6 | 69 | 38 | 8 | 5 | 76 | 54 | 8 | 7 | 81 | 56 | 9 | 12 |
| YP | 22 | 27 | 10 | 6 | 23 | 25 | 13 | 7 | 22 | 20 | 8 | 5 | 21 | 25 | 15 | 16 |

325° F.*: After holding for 30 min at 200 rpm at 325° F.

Slurry 1 without any PEGAES, ENP, and acrylamide copolymer showed a good yield point at 325° F., but lost significant yield point in the next 30 minutes. Similar behavior was found when using only PEGAES and ENP in Slurry 2 and only acrylamide copolymer in Slurry 3. When a combination of acrylamide copolymer, PEGAES, and ENP was used in Slurry 4, however, Slurry 4 not only showed good retention of viscosity but also showed good stability after 30 minutes at 325° F.

EXAMPLE 2

Spacer Fluids having Different Densities

The effect of a combination of acrylamide copolymer, PEGAES, and ENP at different densities was measured next. The spacer fluid formulations tested are provided in Table 3 below.

TABLE 3

SPACER FLUID FORMULATIONS AT DIFFERENT DENSITIES

| Materials | Unit of Measurement | Slurry 5 | Slurry 6 | Slurry 7 | Slurry 8 |
| --- | --- | --- | --- | --- | --- |
| Density | lb/gal | 9 | 9 | 16 | 16 |
| Mixture of polysaccharide gum, sepiolite clay, calcium carbonate, and walnut shells | lb/bbl | 45 | 45 | 25 | 25 |
| Acrylamide Copolymer | gal/bbl | — | 0.4 | — | 0.6 |
| PEGAES | gal/bbl | 0.45 | 0.45 | 0.45 | 0.45 |
| ENP | gal/bbl | 0.5 | 0.5 | 0.5 | 0.5 |
| Barite | lb/bbl | 9.2 | 8.7 | 407.5 | 406.8 |
| D-Air 3000L ™ Defoamer | gal/bbl | 0.1 | 0.1 | 0.1 | 0.1 |
| Water | gal/bbl | 37.7 | 37.3 | 27.5 | 26.95 |

The viscosities of the different formulations were tested as described in Example 1, and the rheology results are shown in Table 4 below.

TABLE 4

RHEOLOGY DATA RESULTS

| RPM | Slurry 5 | | | | Slurry 6 | | | | Slurry 7 | | | | Slurry 8 | | | |
| --- | --- | --- | --- | --- | --- | --- | --- | --- | --- | --- | --- | --- | --- | --- | --- | --- |
| | 80° F. | 180° F. | 325° F. | 325° F.* | 80° F. | 180° F. | 325° F. | 325° F.* | 80° F. | 180° F. | 325° F. | 325° F.* | 80° F. | 180° F. | 325° F. | 325° F.* |
| 300 | 53 | 35 | 11 | 8 | 55 | 35 | 12 | 12 | 146 | 93 | 22 | 15 | 188 | 107 | 24 | 26 |
| 200 | 44 | 29 | 11 | 6 | 45 | 28 | 11 | 12 | 113 | 76 | 20 | 13 | 146 | 85 | 21 | 22 |
| 100 | 31 | 24 | 9 | 5 | 30 | 21 | 10 | 10 | 77 | 56 | 17 | 12 | 95 | 58 | 17 | 18 |
| 60 | 26 | 21 | 8 | 5 | 24 | 19 | 9 | 9 | 59 | 46 | 16 | 11 | 71 | 46 | 16 | 17 |
| 30 | 21 | 19 | 7 | 5 | 18 | 17 | 8 | 8 | 44 | 38 | 15 | 10 | 49 | 35 | 15 | 15 |
| 6 | 13 | 13 | 7 | 4 | 11 | 11 | 7 | 8 | 27 | 29 | 14 | 9 | 23 | 20 | 14 | 12 |
| 3 | 11 | 11 | 7 | 4 | 9 | 9 | 7 | 7 | 23 | 28 | 13 | 8 | 21 | 17 | 13 | 10 |
| PV | 40 | 22 | 4 | 4 | 45 | 24 | 5 | 5 | 120 | 64 | 9 | 5 | 167 | 88 | 11 | 14 |
| YP | 16 | 15 | 7 | 4 | 13 | 13 | 8 | 8 | 32 | 32 | 15 | 10 | 30 | 24 | 14 | 13 |

325° F.*: After holding for 30 min at 200 rpm at 325° F.

As can been seen from the results in Table 4, the combination of acrylamide copolymer, PEGAES, and ENP also works to provide improved rheological characteristics for a wide density range.

What is claimed is:

1. A method of treating a subterranean formation comprising:
    providing a spacer fluid comprising acrylamide/2-acrylamido-2-methylpropane sulfonic acid grafted copolymer (acrylamide copolymer), polyethylene glycol alkyl ether sulfate (PEGAES), and ethoxylated nonylphenol (ENP); and
    introducing the spacer fluid into a wellbore of the subterranean formation to displace at least a portion of a first fluid from the wellbore,
    wherein the spacer fluid maintains its yield point for at least half an hour when subjected to a temperature of greater than 300° F. and up to 325° F.

2. The method of claim 1, wherein the acrylamide copolymer, the PEGAES, or the ENP is present in an amount of about 0.1% to about 25% by weight of the spacer fluid.

3. The method of claim 1, wherein the acrylamide copolymer, the PEGAES, and the ENP are each present in an amount of about 0.1% to about 25% by weight of the spacer fluid.

4. The method of claim 3, wherein the acrylamide copolymer, the PEGAES, and the ENP are each present in an amount of about 0.25% to about 10% by weight of the spacer fluid.

5. The method of claim 1, wherein the spacer fluid further comprises a weighting agent or a defoaming agent.

6. The method of claim 1, wherein the spacer fluid further comprises polysaccharide gum, sepiolite clay, calcium carbonate, and walnut shells.

7. The method of claim 1, wherein the first fluid comprises a drilling fluid.

8. The method of claim 7, further comprising introducing a cement composition into the wellbore to displace at least a portion of the spacer fluid from the wellbore, wherein the spacer fluid separates the cement composition from the drilling fluid.

9. The method of claim 1, wherein a pump is used to introduce the spacer fluid into the wellbore.

10. The method of claim 1, wherein the spacer fluid has a density of about 8 pounds per gallon (ppg) to about 20 ppg.

11. The method of claim 1, wherein the spacer fluid maintains its yield point for about 2 hours when subjected to a temperature of greater than 300° F. and up to 325° F.

12. A method of treating a subterranean formation comprising:
    providing a spacer fluid comprising acrylamide/2-acrylamido-2-methylpropane sulfonic acid grafted copolymer (acrylamide copolymer), polyethylene glycol alkyl ether sulfate (PEGAES), and ethoxylated nonylphenol (ENP);
    introducing the spacer fluid into a wellbore of the subterranean formation to displace at least a portion of a first fluid from the wellbore; and
    subjecting the spacer fluid to a downhole temperature of greater than 300° F. and up to 325° F.,
    wherein the spacer fluid maintains its yield point for at least half an hour when subjected to a temperature of greater than 300° F. and up to 325° F.

13. The method of claim 12, wherein the acrylamide copolymer, the PEGAES, or the ENP is present in an amount of about 0.1% to about 25% by weight of the spacer fluid.

14. The method of claim 12, wherein the acrylamide copolymer, the PEGAES, and the ENP are each present in an amount of about 0.1% to about 25% by weight of the spacer fluid.

15. The method of claim 12, wherein the spacer fluid further comprises a weighting agent or a defoaming agent.

16. The method of claim 12, wherein the spacer fluid further comprises polysaccharide gum, sepiolite clay, calcium carbonate, and walnut shells.

17. The method of claim 12, wherein the first fluid comprises a drilling fluid.

18. The method of claim 17, further comprising introducing a cement composition into the wellbore to displace at least a portion of the spacer fluid from the wellbore, wherein the spacer fluid separates the cement composition from the drilling fluid.

19. The method of claim 12, wherein the spacer fluid has a density of about 8 pounds per gallon (ppg) to about 20 ppg.

20. The method of claim 12, wherein the spacer fluid maintains its yield point for about 2 hours when subjected to a temperature of greater than 300° F. and up to 325° F.

* * * * *